United States Patent Office 3,088,523
Patented May 7, 1963

3,088,523
MARINE ENGINE CONTROL SYSTEM WITH
VARIABLE PITCH PROPELLER
Richard D. Smalley and Warren H. Krogstad, Milwaukee,
Wis., assignors to Nordberg Manufacturing Company,
Milwaukee, Wis., a corporation of Wisconsin
Filed Apr. 11, 1960, Ser. No. 21,330
11 Claims. (Cl. 170—135.74)

This invention is in the field of governor control systems and is concerned with a control system for a marine engine or the like.

A primary object of the invention is a control arrangement for one or more marine engines which will protect the engine or engines at all times.

Another object is a control arrangement of the above type that will protect engines against thermal shock loads.

Another object is a control system which fixes the fuel settings on the engines and takes care of varying torque requirements by propeller pitch correction.

Another object is a governor control for a marine engine or the like which uses a pitch regulating governor to cause a fuel regulating governor to call for constant fuel.

Another object is a program control system in which the programmed pitch to a variable pitch propeller is overpitched and pitch is taken off by a pitch regulating governor.

Another object is a control system of the above type which may be used in multiple engine setups.

Another object is to accomplish load changes commonly encountered by marine engines driving variable pitch propellers by making minor speed and/or propeller pitch changes instead of fuel changes.

Another object is to make the thermal and pressure cycles more uniform in engines of the above type.

Another object is a control system of the above type which prevents deliberate or unintentional overloading of the engine by setting a propeller pitch greater than is required for the prevailing conditions of ship, sea and weather.

Another object is a control system for multiple engine installations which will equally distribute the load between engines.

Another object is a control system for multiple engine installations in which the programmed relationships may be changed when operating with any combination or numbers of engines to obtain optimum performance of engines and propeller.

Another object is a control system for a marine engine or the like in which the programmed relationship may be changed depending upon the operating condition to obtain maximum efficiency.

Another object is a control arrangement of the above type in which the program relationship may be changed in a multiple engine setup to obtain optimum running conditions as engines are taken off or added.

Figure 1:
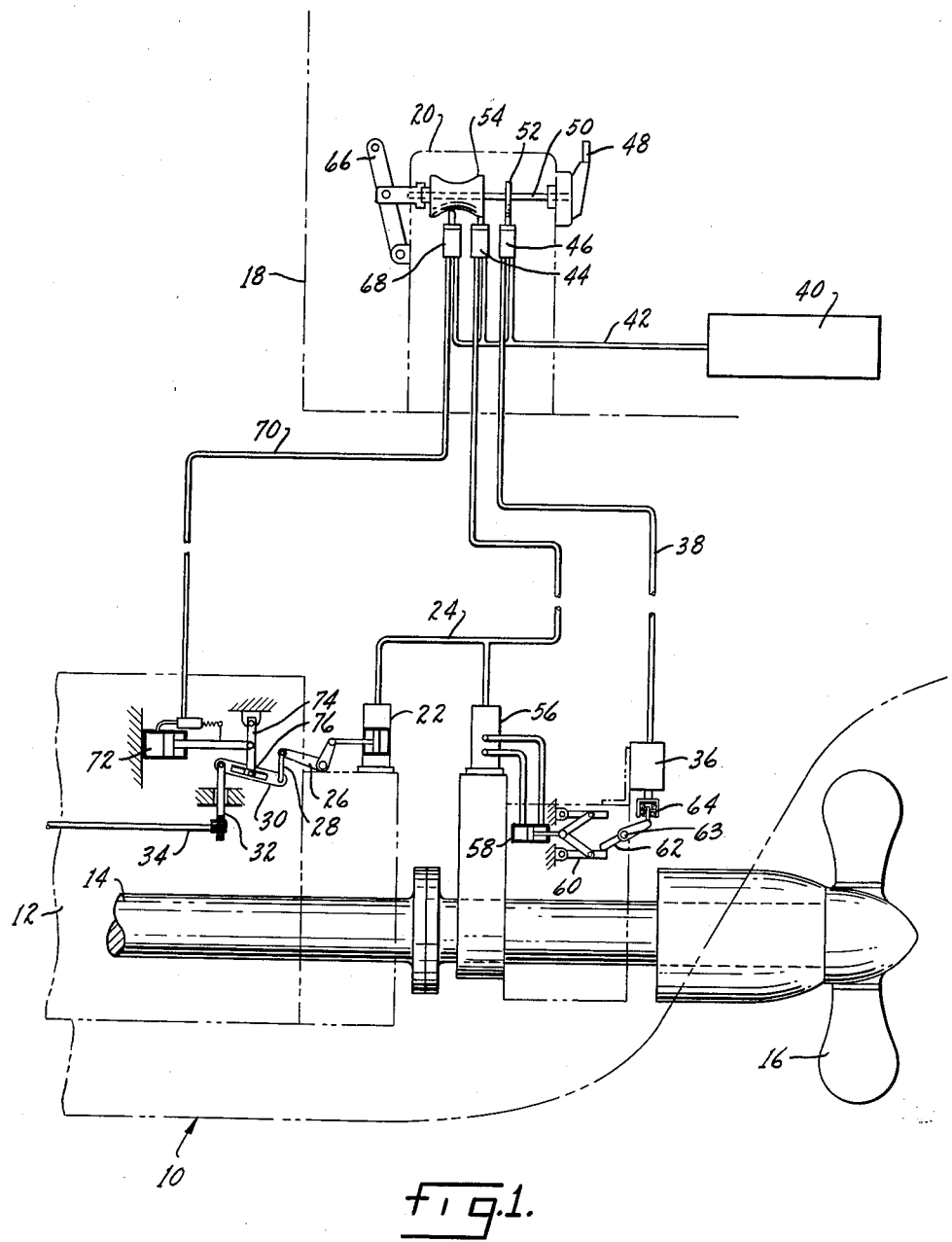
Figure 2:
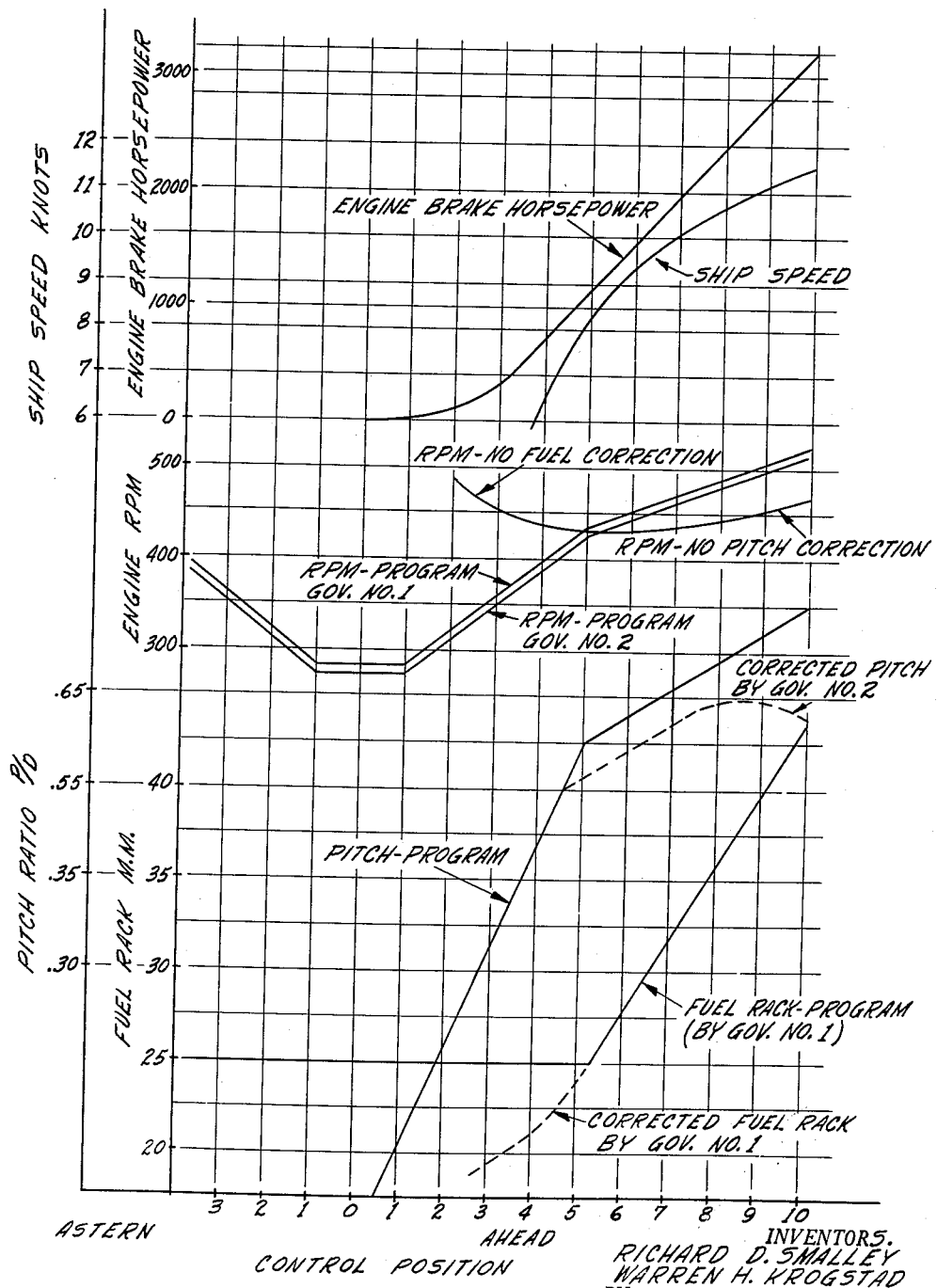
Figure 3:
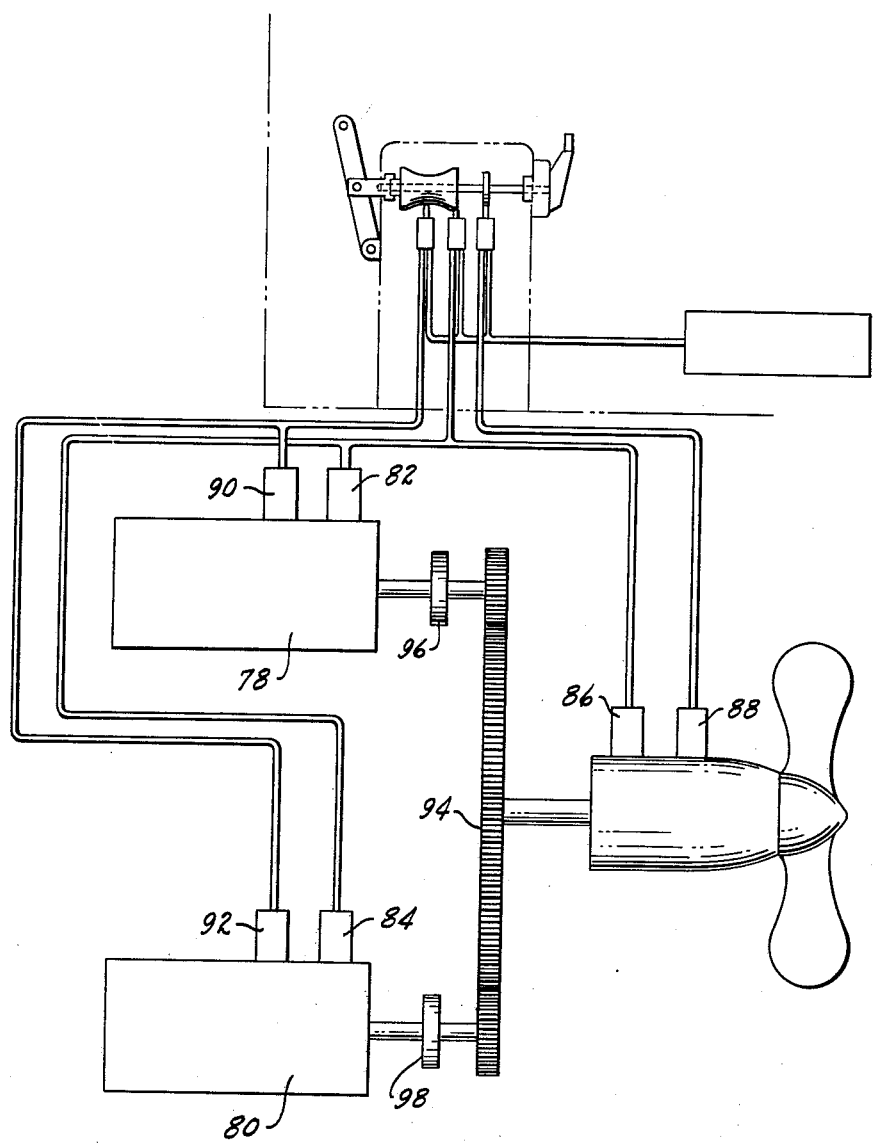

Other objects will appear from time to time in the ensuing specification and drawings in which:

FIGURE 1 is a schematic of a ship control system;
FIGURE 2 is a diagram showing the programmed relationships of the various components and performance; and
FIGURE 3 is a schematic of a multiple engine setup.

In FIGURE 1, a ship hull has been indicated generally at 10 with an engine 12 for turning a drive shaft 14 which is connected in any suitable manner to a propeller 16. Although the propeller has not been shown in detail, it will be understood that it is a variable pitch propeller of any suitable type. The bridge or control station of the ship has been indicated generally at 18 with a control stand at 20. Since most engines on ships or in marine use are diesel, we shall hereinafter refer to a diesel engine, but it should be understood that the invention is not necessarily restricted thereto.

A suitable governor 22 is provided which we shall hereinafter refer to as the engine fuel regulator governor or first governor. This governor is equipped so that its set speed and maximum allowable fuel position, referred to herein as the fuel limiter, is determined by an air pressure signal from the governor air connection. Such a fuel or load limiter is conventional in governors and has not been shown in detail. The varying air pressure from an air line 24 from the bridge or pilot house or control stand is fed to the governor. The operating mechanism of the governor, be it a power piston as schematically shown or otherwise, controls the fuel pumps of the engine through a linkage arrangement which may include a crank 26 connected by a link 28 to an adjustable lever 30 which in turn operates a rack 32 to rotate the regulating shaft 34 for the fuel pumps not shown. This governor controls the rack position of the fuel pumps to vary the amount of fuel injected into the cylinders as the load or thrust requirements on the shaft vary to maintain constant shaft speed or r.p.m. This is to say that it is a speed regulating governor which may have its speed setting changed during operation, but at any particular setting it seeks to maintain constant crank shaft r.p.m.

We also use a positioner 36, which shall be referred to as the pitch positioner, to set the pitch of the propeller in accordance with an air signal received from the bridge or pilot house through a suitable lead 38. A source of pressure air 40 supplies pressure air to the control stand 20 through a suitable lead 42 which is broken up into branches that lead to air regulators 44 and 46. A control handle 48 positions a shaft 50 which carries cams 52 and 54 engaged by the air regulators 44 and 46. Thus, the position of the control handle 48 will determine the pressure of the air passed by the regulators. Line 38 from the pitch positioner 36 is connected to the first regulator 46 and line 24 from the first governor is connected to the other regulator 44. Thus signals will be sent to the first governor and the pitch positioner to set shaft speed and propeller pitch which are programmed to each other in all positions of the control handle. The program is worked out depending upon the operating conditions anticipated for a particular ship or installation to give the most efficient operation of the engine.

We also provide a second or pitch regulating governor 56 which may be a standard speed regulating governor slightly modified and tied into air line 24 so that it receives a variable air signal from the control stand. The speed setting of the pitch regulating governor is set slightly below speed setting of the fuel regulating governor so that the fuel regulating governor will be operating against its load limiter in a specific range. The servo 58 of this governor operates a scissors mechanism 60 or the like which bears against a propeller pitch control lever 62 on a shaft 63 which sets the pitch of the propeller, and which in turn is positioned through a weak link or lost motion connection 64 by the pitch positioner 36. This is to say that the pitch of the propeller 16 is set by the pitch positioner 36, but the pitch setting may be modified by the second governor 56 through the scissors arrangement 60 which will vary the setting of the pitch control mechanism 63. In the diagrammatic showing of FIGURE 1, when lever 62 and shaft 63 are rotated clockwise, pitch is taken off, and vice versa. The scissors 60 act as a one-way connection between the pitch control shaft 63 and pitch regulating governor 56.

We may wish to change the programmed relationship in view of different operating conditions such as the sea, weather or otherwise, to obtain maximum efficiency under any particular conditions. This may be done by a second control lever 66 at the control stand to slide or shift the cam 54 on the control shaft to which it is keyed. We may position a third air regulator 68 to bear against this cam to send a pressure signal through line 70 to a cylinder 72 which moves a lever 74 that carries the slidable pivot 76 of adjustable lever 30 in the linkage between the fuel regulating governor or so-called No. 1 governor and the fuel pump shaft. Cylinder 72 may have its piston moved in one direction by air pressure with a spring return, as shown.

The purpose of this linkage is to change fuel regulation with the programmed propeller pitch and it may be used to get the most efficient operation under any particular set of conditions, or it might be used in a multiple engine setup to get the most efficient operation when engines are either added or taken off.

The use, operation and function of the invention are as follows:

We provide a control system which will either vary the amount of fuel supplied to maintain speed setting or will hold the fuel constant and vary the pitch setting of the propeller to hold speed constant, depending on the programming of the propeller pitch and engine speed. The pitch regulating and fuel regulating governors receive the same signal from the control stand. The pitch regulating governor is constructed to set a speed slightly lower than that set in the fuel regulating governor. Engine speed can be controlled by either governor, depending upon how the propeller pitch, engine speed and fuel to the engine are programmed which in turn is determined by the position of the control handle at the control station. At a particular engine speed if more fuel than load (meaning propeller pitch) is programmed, the fuel regulating governor will regulate. In such a situation the pitch regulating governor cannot increase the propeller pitch any greater than that set by the positioner. At other engine speeds more load than fuel will be programmed, and in this case the pitch regulating governor will regulate speed by taking off propeller pitch to hold a set speed. Under these conditions the fuel regulating governor cannot supply more fuel since it will be operating in an underspeed condition and the fuel rack will be against the fuel limiter or stops. Thus, the engine will not be supplied with varying amounts of fuel as the torque requirements on the shaft vary. This then does away with thermal shocks on the engine itself due to fuel supply variation. In short, the engine will run at fixed fuel with speed variation being taken care of by propeller pitch changes and the engine will be fully protected.

Depending upon the setting of the control handle, the propeller will be set at a selected pitch. As the torque requirements vary, as caused, for example, by wind condition, ship draft, maneuvering, the type of sea, etc., the No. 2 governor, which is the pitch regulating governor, will sense the speed variations and will vary the pitch setting through the scissors mechanism, or whatever is used, so that speed variation will be taken out by pitch correction.

The control system may be used in a multiple engine setup as shown in FIGURE 3, for example two engines 78 and 80, in which each engine would have a fuel regulating governor, as at 82 and 84, but only one speed regulating governor or No. 2 governor would be used, as at 86, to vary the pitch setting in accordance with speed variations, all connected to the second air regulator, as at 44 in FIGURE 1. In such a setup, the second control handle might have its scale appropriately graduated to indicate the proper setting for operation on either one, two or how many engines are used to change the programmed relationship. The propeller would also have a pitch positioner 88, like the pitch positioner 36 in FIGURE 1, connected to the first air regulator, as at 46 in FIGURE 1. Each engine would have a servo 90 and 92, similar to servo 72 in FIGURE 1, so that the position of the control handle, as at 66 in FIGURE 1, would vary the fuel rack settings in accordance with some desired condition, such as the number of engines in operation. In any particular setting, each engine would run at a fixed fuel position for any particular setting of the main control handle and speed variation would be taken care of by pitch correction from the No. 2 governor.

Or the second control handle might be used on a single engine setup to vary the programmed relationship between fuel pitch and/or speed to obtain the most efficient operation under any particular set of operating conditions, for example wind conditions, shift draft, maneuvering, etc. The engines will be suitably geared, as at 94 in FIGURE 3 to the propeller, and as is conventional, each engine would have a suitable clutch or coupling, as at 96 and 98, so that either engine could be disconnected from the propeller, when not in operation.

An example of a program relationship and operating values is shown in FIGURE 2 in which the position of control handle 48 is the abscissa with 10 positions ahead and 4 astern shown. Since the astern positions may only be symmetrical opposites of the ahead positions, only ahead will be considered. In control handle positions 1 through 5, the fuel regulating governor or No. 1 governor controls engine speed by regulating the fuel racks. In these positions, the engine will have more fuel than is required for the programmed load.

In positions 1 through 5 the propeller has a relatively flat pitch going down to zero and speed cannot be accurately controlled by pitch changes. Thus in these positions control is affected by fuel changes.

In positions 5 through 10 governor No. 2 or the pitch regulating governor controls the engine speed. Governor No. 1 runs in an under speed condition and its operating mechanism will be against the stops of the fuel limiter. Thus, in these positions, the engine will be running at each position with fixed fuel and speed and torque variations will be taken care of by corrections of propeller pitch. In positions 5 through 10, the pitch positioner is set to over pitch the propeller and pitch is taken off by the pitch regulating governor so that the engine and control will operate satisfactorily both ahead and astern.

We have shown the pitch program and it will be noted that the actual pitch is below the programmed pitch in positions 5 through 10, while the corrected fuel rack position, as regulated by governor No. 1, is below the programmed fuel rack below position No. 5.

In the speed programs for governors Nos. 1 and 2, it will be noted that the program for governor No. 2 is approximately 10 r.p.m. below the governor No. 1 in all positions, which causes the engine to run with fixed racks in positions 5 through 10. We have also indicated representative values for engine brake horsepower and ship speed with the shaft r.p.m. being shown for no fuel correction or as programmed below position No. 5 and for no pitch correction or as programmed between positions 5 and 10.

While the change over point has been shown as approximately position 5, it should be understood that this may be varied and should be considered a function of how rapidly propeller pitch can be changed, and the prevailing conditions of the ship, sea, weather, etc.

The second control handle at the control station could be used to change the programmed relationship between, for example, the fuel allowed, the set r.p.m. of the governors No. 1 and No. 2, and the propeller pitch, and, as such, would change the relationship of the lines designated "fuel rack-program" and "r.p.m.-program-gov.-No. 1 and No. 2" in the example of FIGURE 2. Or it may be used to change the programmed relationship to obtain maximum efficiency under any particular operating condition. So FIGURE 2 should be considered as representative of any particular setting of the second control handle.

Whereas we have shown and described the preferred form of our invention, it should be understood that suitable additional modifications, changes, substitutions and alterations may be made without departing from the invention's fundamental theme. We, therefore, wish that the invention be unrestricted, except as by the appended claims.

We claim:

1. A control system for an engine driving a variable pitch propeller comprising a governor with a fuel limiter for setting the quantity of fuel supplied to the engine in accordance with a desired speed, a positioner for setting the pitch of the propeller, and a second governor set for a speed slightly less than the speed setting of the first governor and associated with the positioner so that over only a portion of the load range the fuel limiter of the first governor will cause a constant quantity of fuel to be supplied to the engine at any particular setting and the second governor will vary the pitch settings of the propeller to maintain constant engine speed.

2. A control system for an engine driving a variable pitch propeller comprising a first governor with a fuel limiter for controlling the amount of fuel supplied to the engine, a positioner for varying the pitch of the propeller, a central control for varying the setting of the first governor and positioner in accordance with a programmed relationship of speed and pitch setting, and a second governor operatively associated with the positioner and central control and set at a speed setting slightly less than the speed setting of the first governor so that, over at least a portion of the load range, at any particular programmed position at the central control, the fuel limiter of the first governor will supply a constant quantity of fuel and engine speed variations, due to varying torque requirements, will be taken care of by the second governor altering the pitch settings called for by the positioner.

3. A method of controlling an engine driving a variable pitch propeller, including the steps of setting the quantity of fuel supplied to the engine in accordance with any desired speed, programming the pitch of the propeller to the fuel settings so that for any particular fuel setting, the propeller will have a corresponding set pitch, keeping the quantity of fuel supplied constant at any particular setting over only a portion of the load range, and varying the pitch settings of the propeller during said portion of the load range to keep engine speed constant as torque requirements vary.

4. The method of claim 3 further characterized in that the system is applied to a multiple engine setup and further including the step of varying the programmed relationship between the quantity of fuel supplied and the pitch settings in accordance with the number of engines in operation driving the propeller.

5. The method of claim 3 further characterized by and including the step of overpitching the propeller relative to the fuel settings in the initial programming thereof, and further characterized in that the step of varying the pitch settings of the propeller includes taking pitch off of the propeller from its overpitched condition to keep the engine speed constant as torque requirements vary.

6. The method of claim 3 further characterized by and including the step of changing the programmed relationship of pitch and fuel settings, dependent upon the particular operating conditions of the engine, to obtain maximum efficiency under all operating conditions.

7. A control system for an engine driving a variable pitch propeller comprising a first governor with a fuel limiter for controlling the amount of fuel supplied to the engine, a positioner for varying the pitch of the propeller, a central control for varying the setting of the first governor and positioner in accordance with a programmed relationship of speed and propeller pitch, and a second control for changing the programmed relationship of speed and pitch setting, dependent upon the operating conditions of the engine, to obtain maximum efficiency under any particular set of conditions.

8. The structure of claim 7 further characterized by and including a second governor operatively associated with the positioner and central control and set at a speed setting slightly less than the speed setting of the first governor so that, over at least a portion of the load range, at any particular programmed position at the central control, the fuel limiter of the first governor will cause the first governor to supply a constant quantity of fuel and engine speed variations, due to varying torque requirements, will be taken care of by the second governor altering the pitch settings called for by the positioner.

9. A method of controlling an engine driving a variable pitch propeller under varying torque requirements, including the steps of supplying a constant quantity of fuel to the engine at any particular speed setting over only a portion of the load range, keeping the engine speed constant as torque requirements vary at any particular speed setting over the said portion of the load range by varying propeller pitch, and varying the quantity of fuel supplied to the engine over the rest of the load range as torque requirements vary at any particular speed setting to maintain constant engine speed.

10. The method of claim 9 further characterized by and including the step of overpitching the propeller relative to the fuel settings over the rest of the load range, and taking pitch off of the propeller from its overpitched condition in the said portion of the load range to keep the engine speed constant as torque requirements vary.

11. A control system for an engine driving a variable pitch propeller, including means for supplying fuel to the engine in quantities in accordance with any desired speed at varying load requirements, means for varying the pitch of the propeller, means for automatically varying the pitch of the propeller upon a change in load requirement at a particular fuel setting over only a portion of the load range to maintain constant engine speed with a constant quantity of fuel being supplied to the engine, and means for varying the amount of fuel being supplied over the other portion of the load range upon a change in load requirement to maintain constant engine speed.

References Cited in the file of this patent

UNITED STATES PATENTS

| | | |
|---|---|---|
| 2,402,065 | Martin | June 11, 1946 |
| 2,588,371 | Englesson | Mar. 11, 1952 |
| 2,669,310 | Haskins | Feb. 16, 1954 |
| 2,759,549 | Best | Aug. 21, 1956 |
| 2,781,856 | Danvers | Feb. 19, 1957 |
| 2,794,507 | Banning | June 4, 1957 |
| 2,840,171 | Jedrziewski et al. | June 24, 1958 |
| 2,935,136 | Wall | May 3, 1960 |